United States Patent
Gigliotti et al.

(10) Patent No.: US 7,575,418 B2
(45) Date of Patent: Aug. 18, 2009

(54) EROSION AND WEAR RESISTANT PROTECTIVE STRUCTURES FOR TURBINE COMPONENTS

(75) Inventors: Michael Francis Xavier Gigliotti, New York, NY (US); Canan Uslu Hardwicke, Niskayuna, NY (US); Liang Jiang, Schenectady, NY (US); Don Mark Lipkin, Niskayuna, NY (US); Samuel Vinod Thamboo, Latham, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/955,056

(22) Filed: Sep. 30, 2004

(65) Prior Publication Data

US 2006/0068214 A1    Mar. 30, 2006

(51) Int. Cl.
*F03B 15/20* (2006.01)
*F03B 15/04* (2006.01)
*C25D 5/28* (2006.01)
*B32D 15/00* (2006.01)
*B32D 15/01* (2006.01)

(52) U.S. Cl. .......... 416/241 R; 428/660; 428/636; 428/680; 428/937; 428/938; 428/939; 428/940

(58) Field of Classification Search ........ 428/660, 428/636, 680, 937, 938, 939, 940; 148/527, 148/669; 416/241 R; 420/420
See application file for complete search history.

(56) References Cited

U.S. PATENT DOCUMENTS

| | | | | |
|---|---|---|---|---|
| 3,060,557 A | * | 10/1962 | Rostoker et al. | ......... 428/661 |
| 4,380,574 A | | 4/1983 | Gessinger et al. | |
| 4,931,152 A | * | 6/1990 | Naik et al. | ......... 205/191 |
| 5,124,122 A | * | 6/1992 | Wojcik | ......... 420/421 |
| 5,326,525 A | * | 7/1994 | Ghosh | ......... 419/23 |
| 5,448,828 A | | 9/1995 | Willems et al. | |
| 5,531,369 A | | 7/1996 | Richman et al. | |
| 5,879,760 A | * | 3/1999 | Eylon et al. | ......... 427/528 |
| 5,956,845 A | | 9/1999 | Arnold | |

(Continued)

FOREIGN PATENT DOCUMENTS

DE    2551895 A1    5/1976

(Continued)

OTHER PUBLICATIONS

Takashi et al. "Multifunctional Alloys Obtained via a Dislocation-Free Plastic Deformation Mechanism" *Science* vol. 300, Apr. 18, 2003, pp. 464-467.

(Continued)

*Primary Examiner*—Timothy M Speer
*Assistant Examiner*—Gordon R Baldwin
(74) *Attorney, Agent, or Firm*—Ann M. Agosti

(57) ABSTRACT

Disclosed herein is a turbine component comprising a substrate; and a protective structure formed on the substrate, wherein the protective structure comprises an α-β titanium alloy, a β-titanium alloy or a near-β titanium alloy. Disclosed herein too is a process for providing a protective structure to a turbine component, comprising affixing a protective structure on a turbine component; wherein the protective structure comprises an α-β titanium alloy, a near-β titanium alloy or a β-titanium alloy.

20 Claims, 3 Drawing Sheets

U.S. PATENT DOCUMENTS

| | | | |
|---|---|---|---|
| 6,127,044 | A * | 10/2000 | Yamamoto et al. .......... 428/636 |
| 6,387,541 | B1 | 5/2002 | Gray et al. |
| 6,451,454 | B1 | 9/2002 | Hasz et al. |
| 6,458,317 | B1 | 10/2002 | Koskinen et al. |
| 6,551,064 | B1 * | 4/2003 | Mannava et al. ........ 416/223 A |
| 6,607,693 | B1 | 8/2003 | Saito et al. |
| 6,886,622 | B2 | 5/2005 | Villhard |
| 2001/0021346 | A1 | 9/2001 | Doi et al. |
| 2005/0207896 | A1 | 9/2005 | Gigliotti, Jr. et al. |
| 2006/0045785 | A1 * | 3/2006 | Hu et al. ........................ 419/5 |

FOREIGN PATENT DOCUMENTS

| | | |
|---|---|---|
| EP | 0 508 414 B1 | 7/1996 |
| EP | 0 515 078 B1 | 12/1997 |
| EP | 0 642 876 B1 | 3/2000 |
| EP | 1 209 248 A2 | 5/2002 |
| GB | 2 241 961 A | 2/1991 |
| JP | 01309791 * | 6/1988 |
| JP | 09277432 * | 4/1996 |
| WO | WO 99/66102 | 12/1999 |

OTHER PUBLICATIONS

Minoru Umemoto "Nanocrystallization of Steels by Various Severe Plastic Deformation" Department of Production Systems Engineering, Toyohashi University of Technology, Toyohashi, Aichi 441-8580, Japan, Jun. 2003, pp. 1-11.

Wilkinson Steel and Metals, Stainless Steel Type 316, http://www.wilkinsonsteel.com/stainless/316.htm (2 pages).

U.S. Appl. No. 10/801,843, filed Mar. 16, 2004, Gigliotti, Jr. et al., Erosion And Wear Resistant Protective Structures For Turbine Engine Components (available in IFW).

JP 03134124 Publication Date Jul. 6, 1991 "Titanium alloy excellent in erosion resistance and production thereof" (Abstract Only).

European Search Report for EP 05 25 5970; Date of completion of the search Dec. 21, 2005.

DE2551895 A; Stainless Steel Coatings Deposited by Welding—on Steam Turbine Parts, Using Intermediate Layer to Avoid Hard Zones; May 26, 1976; Societe Generale de Constructions Electriques et Mecaniques Alsthom, Paris; English Abstract Only; 1 page.

JP03-036230; Erosion-Resistant Alloy Steel and its Manufacture; Feb. 15, 1991; Kazuaki, et al; English Abstract Only; 1 page.

JP03-150331; Erosion-Resistant Alloy; Jun. 26, 1991; Masaru et al; English Abstract Only; 1 page.

* cited by examiner

EROSION AND WEAR RESISTANT PROTECTIVE STRUCTURES FOR TURBINE COMPONENTS

BACKGROUND

The present disclosure generally relates to erosion, impact and wear resistant protective structures in the forms of coatings, claddings or section replacements for turbine components. The present disclosure generally relates to methods of manufacturing such erosion, impact and wear resistant protective structures for turbine components.

Erosion, impact and wear resistant protective structures in the forms of coatings, claddings or section replacements that comprise cobalt based alloys such as Stellite® and Haynes 25® (L605) have found various applications in turbine engines. For example, abrasive, wear-resistant claddings are frequently deposited on blade tips. Such claddings are generally employed to decrease the rate of wear of critical components. Other protective structures are placed on leading edges of turbine blades to reduce erosion due to environmental solid particulates (e.g., dirt, sand, and the like). that enter the turbine during operation. Other types of wear protective structures are also placed as coatings, claddings or section replacements on parts of the turbine engine that are susceptible to fretting wear during operation. For example, wear resistant coatings, claddings or section replacements are placed on blade dovetails and nozzle wear pads that rub against an adjacent structure, such as a disk post, or shroud hanger.

Erosion resistant protective structures in the form of coatings, claddings or section replacements have also been used on turbine components that exhibit distress from liquid droplet erosion. In steam turbines, water droplets form in the last rotor stages, corresponding to the lowest pressure portions of the turbines. The droplets can condense on the stationary blade airfoils, e.g., nozzles, where they coalesce into films or rivulets and migrate to the trailing edge of the nozzle. Eventually, the films and/or rivulets are removed from the stationary blade airfoils by the steam flow in the form of water drops. These water drops impact the later stages of rotating blades at speeds approximately equal to the circumferential velocity of the rotating blades. The impact of water drops generates an impulsive contact pressure on the blade material surface, causing progressive erosion of the blade material. Erosion of the steam turbine components can cause power loss, reduce turbine efficiency, and limit blade component lifetime.

In general, the blades in the last few rows of a low-pressure steam turbine are formed by forging a ferrous alloy containing about 11 to about 18 weight percent chromium. Protective structures in the forms of coatings, claddings or section replacements are formed of cobalt based alloys such as those commercially available under the trademark Stellite® from the Deloro Stellite Company. Although these protective structures provide erosion resistance to the base metal, their erosion still results in undesirable, non-recoverable, efficiency losses. The application of protective structures onto a turbine blade also results in reliability problems due to stress corrosion cracking at the joints, manufacturing defects in the forms of voids or cracks, and reduced life due to the added weight.

Accordingly, a continuing need exists in the art for improved erosion, impact and wear resistant protective structures.

BRIEF SUMMARY

Disclosed herein is a turbine component comprising a substrate; and a protective structure formed on the substrate, wherein the protective structure comprises an α-β titanium alloy, a β-titanium alloy or a near-β titanium alloy.

Disclosed herein too is a process for providing a protective structure to a turbine component, comprising affixing a protective structure on a turbine component; wherein the protective structure comprises an α-β titanium alloy, a near-β titanium alloy or a β-titanium alloy.

Disclosed herein too is a process for providing a protective structure to a turbine component, comprising affixing a diffusion-mitigating layer on a region of the turbine component to be protected with the protective structure, wherein the diffusion-mitigating layer is selected from a group consisting of pure metals or alloys that do not form brittle and/or low melting phase due to interaction with erosion resistant structure and/or substrate; and affixing a protective structure to the diffusion-mitigating layer, wherein the affixing of the diffusion-mitigating layer and the protective structure is accomplished by plating, ion plasma deposition, powder coating, sputtering, electron beam deposition, plasma thermal spray, brazing, co-extrusion, explosive bonding, hot-isotactic-pressing, co-forging, forging, fusion welding, co-rolling, friction-stir welding, or a combination comprising at least one of the foregoing processes; and wherein the protective structure comprises an α-β titanium alloy, a near-β titanium alloy or a β-titanium alloy.

Disclosed herein is a turbine component, comprising a β-titanium alloy or a near-β titanium alloy.

Disclosed herein too is a turbine component comprising a substrate; a diffusion-mitigating layer affixed to the substrate; and a protective structure affixed to a surface of the diffusion-mitigating layer that is opposed to the surface in contact with the substrate, wherein the protective structure comprises an α-β titanium alloy, a near-β titanium alloy or a β-titanium alloy.

DETAILED DESCRIPTION

Figure 1:
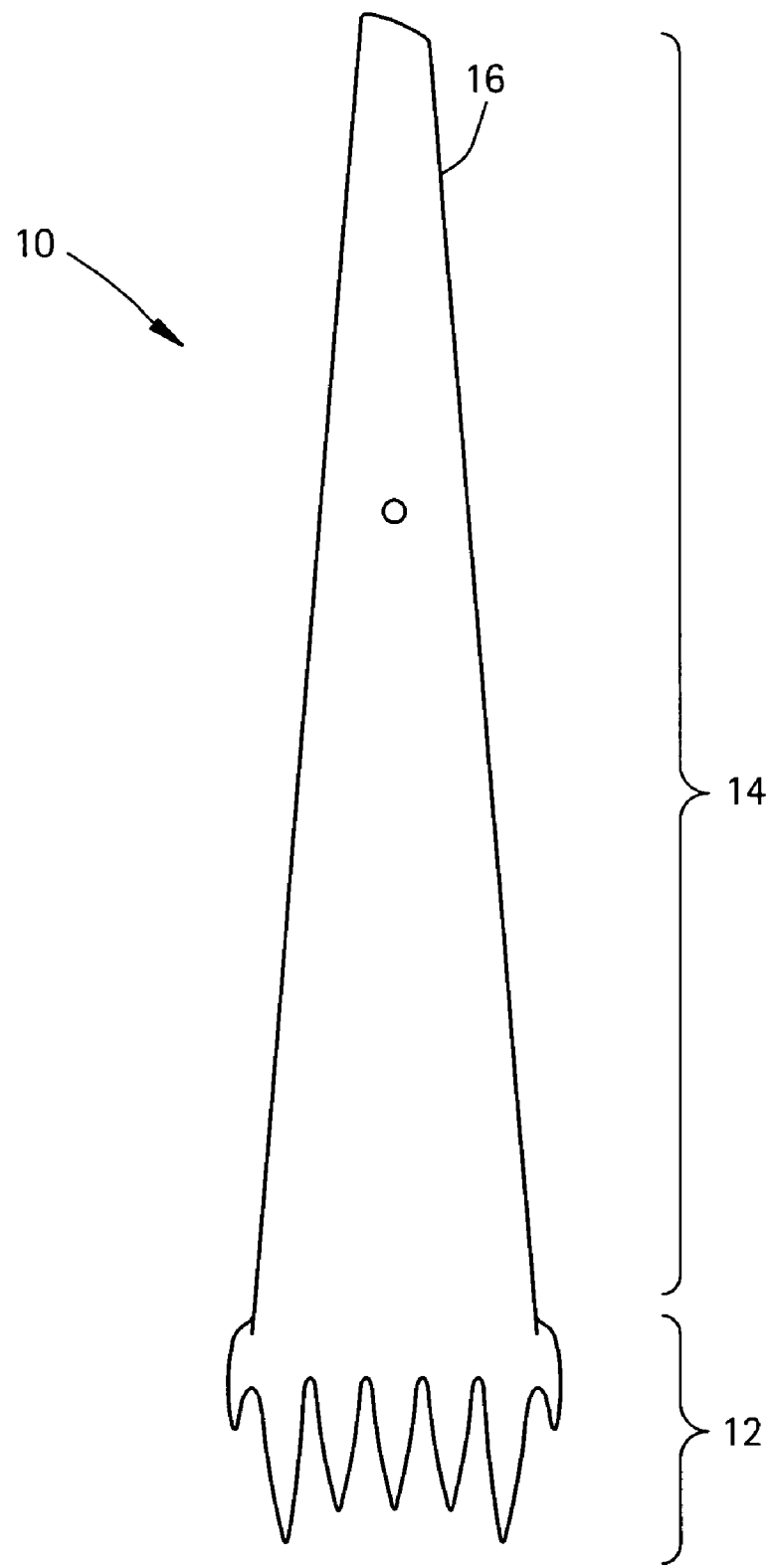
FIG. 1 illustrates, in perspective, an exemplary turbine component that can be treated with the protective structures of the present disclosure.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein are coatings, claddings or section replacements (hereinafter protective structures) for surfaces of turbine components that are prone to wear, erosion and/or impact damage. The wear, erosion and impact damage is caused by particulates (such as droplets of water) impinging on the turbine component. The protective structures generally comprise an α-β titanium alloy, a near-β titanium alloy or a β-titanium alloy and provide erosion resistance, wear resistance and/or impact resistance. It is desirable for the α-β titanium alloy, the β-titanium alloy or the near-β titanium alloy to have a titanium rich body-center-cubic structure that has a Pearson symbol cubic internal 2 (cI2) or space group Im 3m. As used herein, the terms "erosion resistant", "wear resistant" or "impact resistant" are interchangeable and are intended to infer a loss or damage of base material, such as a turbine component, due to solid or liquid particle impingement.

The protective structures are applied to those turbine components that are in the primary and secondary air and steam flow paths, including the hot gas path, the steam path and the water path. These may also be applied to areas in the fuel path. Preferred turbine components to which the protective structures are affixed are stationary and/or rotating airfoils. Examples of other turbine components to which the protective structure is affixed are seals, shrouds, splitters, or the like. The turbine components to which these protective structures can be affixed are present in either power generation turbines such as gas turbines, hydroelectric generation turbines, steam turbines, or the like, or they may be turbines that are used to facilitate propulsion in aircraft, locomotives, or ships. The protective structure can be selectively formed on those regions of the turbine components that are prone to erosion, wear or impact. Alternatively, the protective structures may be disposed on all surfaces of components (hereinafter referred to as substrates) that are in the hot gas path, the steam path, and the water path. In another embodiment, the entire substrate or sections of the substrate can be manufactured from a β-titanium alloy or a near-β titanium alloy. It has been found that the protective structure advantageously absorbs energy related to liquid and/or particulate impact and, unlike other coatings, resists consequent fatigue damage.

The substrates are generally formed of a high-strength and/or high-temperature alloy. Substrates include alloys that are known for high-stress and/or high temperature performance in terms of tensile strength, creep resistance, oxidation resistance, and corrosion resistance, such as, for example, nickel-based alloys, cobalt-based alloys, iron-based alloys, titanium-based alloys, or the like. Other structural alloys used as substrates may also be treated according to the various embodiments of the present disclosure. The substrate alloy is manufactured as a cast or cast-and-wrought structure. Alternatively, the substrate alloy is consolidated from powder, where the resulting powder-metallurgy structure can further be wrought. The protective structure is metallurgically or mechanically bonded to the surface of the substrate to minimize damage due to solid or liquid particulate erosion, impact, and/or wear.

In the case of a substrate formed from a superalloy material, the superalloy is a nickel-based, iron-based, or a cobalt-based alloy, wherein the amount of nickel, iron, or cobalt in the superalloy is the single greatest element by weight. Illustrative nickel-based superalloys include at least about 40 weight percent (wt %) nickel (Ni), and at least one component from the group consisting of cobalt (Co), chromium (Cr), aluminum (Al), tungsten (W), molybdenum (Mo), titanium (Ti), and iron (Fe). Examples of nickel-based superalloys are designated by the trade names Inconel®, Nimonic®, Rene® (e.g., Rene®80-, Rene®95, Rene®142, and Rene®N5 alloys), and Udimet®, and include directionally solidified and single crystal superalloys. Illustrative cobalt-base superalloys include at least about 30 wt % cobalt, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®.

FIG. 1 illustrates, in perspective, an exemplary substrate that can be treated with the protective structures of the present disclosure. It is noted that the operating principles and general structure of the substrates are well known and are therefore not repeated herein. As illustrated in the FIG. 1, an exemplary substrate is a steam turbine blade 10 of the type commonly employed at a final stage of a low-pressure steam turbine. The blade 10 generally includes a dovetail portion 12 and an airfoil portion 14. The dovetail portion is mounted to a rotational shaft (not shown) by means of pins or the like. While the drawing depicts a single blade, the engine typically has a plurality of blades mounted on the rotational shaft. The blades rotate within an area defined by a stationary shroud.

In one embodiment, an α-β titanium alloy, a near-β titanium alloy or a β-titanium alloy protective structure can be applied on any one of or any combination of substrates within a turbine. In one embodiment, the protective structure is formed on those regions of the substrate prone to erosion, wear and/or impact, e.g., regions subject to impact of water droplets during operation, and the like. In an exemplary embodiment, the α-β titanium alloy, the near-β titanium alloy or the β-titanium alloy protective structures are preferably applied at about a leading edge 16 of the airfoil portion 14. It has been found that in the latter stages of a low-pressure steam turbine, the leading edge 16 is most susceptible to water droplet erosion.

The protective structures can be applied only to a portion of the substrate if desired. For example, during operation of the turbine, solid and/or liquid particles impact surfaces of the various components that form the turbine damage the surface via erosion, impact, and/or wear. By affixing these surfaces with the protective structures, the damage caused by the impacting particles droplets is mitigated by the protective structure, thereby minimizing erosion, impact and/or wear. The deformation caused by the impacting particles can be entirely or partially recovered by the large effective elastic strain of the protective structures, where the effective elastic strain is defined as the ratio of yield stress over Young's modulus.

In one embodiment, it is generally desirable for the protective structure to display superior recoverable strain after deformation. In yet another embodiment, the protective structure demonstrates little or negligible work hardening upon large deformation. The superior recoverable strain facilitates the recovery of large deformation resulting from impinging particles, therefore minimizing the erosion, impact, and/or wear damage. In one embodiment, it is desirable for α-β titanium alloy, near-β titanium alloy or β-titanium alloy protective structures to display an elongation of greater than or equal to about 4%, where the elongation is defined as the ratio of increased length over the initial length of a gage section during the tensile testing of the alloy. It is also desirable to have an effective elastic strain of greater than or equal to about 0.7%. In another embodiment, it is desirable for the α-β titanium alloy, the near-β titanium alloy or the β-titanium alloy protective structures to display an elongation of greater than or equal to about 6%, with an effective elastic strain of greater than or equal to about 0.75. In yet another embodiment, it is desirable for the α-β titanium alloy, the near-β titanium alloy or the β-titanium alloy protective structures to display an elongation of greater than or equal to about 8%, with an effective elastic strain of greater than or equal to about 0.6. The effective elastic strain is defined as the ratio of the yield stress to the Young's modulus. The Young's modulus is taken when strain tends to zero during tensile testing of the alloy.

It is desirable for the α-β titanium alloy, the near-β titanium alloy or the β-titanium alloy protective structures used in a turbine component to advantageously have little or no hardening effect due to solid and/or liquid particulate impact. It is further desirable for the α-β titanium alloy, the near-β titanium alloy or the β-titanium alloy protective structures used in a turbine component to recover deformation associated with the impacting particles and resist erosion damage by virtue of their superior recoverable strain.

Figure 2:
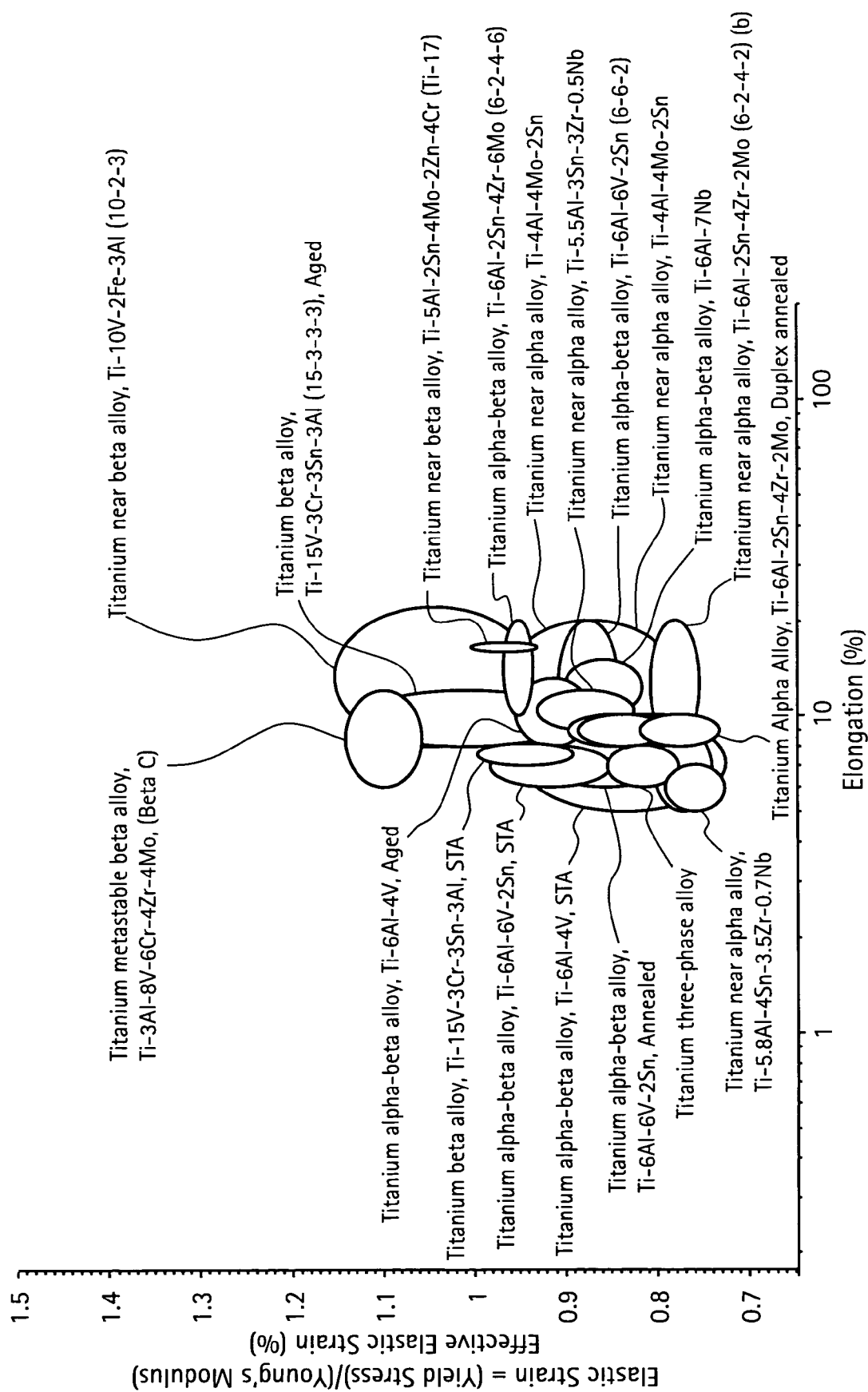
FIG. 2 is a graphical representation showing a plot of percent effective elastic strain versus percent elongation for different α-β or β-titanium alloys that can be used as protective structures or shields in turbine components.

FIG. 2 is a graphical representation of percent effective elastic strain versus percent elongation for different α-β titanium alloys, near-β titanium alloys and β-titanium alloys that can be used as protective structures in turbine components. It is generally desirable for the α-β titanium alloy, near-β titanium alloys or the β-titanium alloy protective structure to comprise at least 10 volume percent of a β phase, based on the total volume of the protective structure. It is more desirable for the α-β titanium alloy, near β-titanium alloy or the β-titanium alloy protective structure to comprise at least 30 volume percent of a β phase, based on the total volume of the protective structure.

Examples of α-β titanium alloys, near-β titanium alloys and β-titanium alloys are shown in the FIG. 2. The examples include an α-β titanium alloy comprising Ti-6Al-4V that has been aged or solution treated and aged (STA); a metastable β-titanium alloy comprising Ti-3Al-8V-6Cr-4Zr-4Mo (also termed as β-C); a near-β titanium alloy comprising Ti-10V-2Fe-3Al (also termed titanium 10-2-3); a near-β titanium alloy comprising Ti-5Al-2Sn-4Mo-2Zn-4Cr (also termed Ti-17); a β-titanium alloy comprising Ti-15V-3Cr-3Sn-3Al (STA); an α-β titanium alloy comprising Ti-6Al-6V-2Sn (STA or annealed); an α-titanium alloy comprising Ti-6Al-2Sn-4Zr-2Mo that has been double annealed (duplex annealed); a near-α titanium alloy comprising Ti-5.8Al-4Sn-3.5Zr-0.7Nb; a β-titanium alloy comprising Ti-15V-3Cr-3Sn-3Al (also termed 10-2-3) that has been aged; an α-β titanium alloy comprising Ti-6Al-2Sn-4Zr-6Mo (also termed 6-2-4-6); a near-α titanium alloy comprising Ti-4Al-4Mo-2Sn; a near-α titanium alloy comprising Ti-5.5Al-3Sn-3Zr-0.5Nb; an α-β titanium alloy comprising Ti-6Al-6V-2Sn (also termed 6-6-2); a near-α titanium alloy comprising Ti-4Al-4Mo-2Sn; an α-β titanium alloy comprising Ti-6Al-7Nb; a near-α titanium alloy comprising Ti-6Al-2Sn-4Zr-2Mo (also termed 6-2-4-2); a β-titanium alloy comprising Ti-6Al-2Cr-2Mo-2Zr-2Sn (also termed Ti62222); a β-titanium alloy comprising Ti-15Mo-3Al-2.7Nb-0.25Si; or the like, or a combination comprising at least one of the foregoing titanium alloys.

In one embodiment, in one manner of providing a protective structure, it is desirable for at least one near-β titanium alloy to generally comprise vanadium group elements in an amount of about 30 to about 60 weight percent (wt %) of the total composition, with the balance being substantially titanium. Vanadium group elements are vanadium, niobium and/or tantalum. This near-β titanium alloy can also comprise zirconium, hafnium, and/or scandium in an amount of less than or equal to about 20 wt %, based on the total weight of this near-β titanium alloy. Other suitable elements and impurities that may be added to this near-β titanium alloy composition are chromium, molybdenum, manganese, iron, cobalt, nickel, or combinations comprising at least one of the foregoing elements. Oxygen may optionally be added to this near-β titanium alloy composition if desired.

It is desirable for this near-β titanium alloy to have a Young's modulus of less than or equal to about $80 \times 10^9$ Pascals (80 GPa). In another embodiment, it is desirable for this near-β titanium alloy to have a Young's modulus of less than or equal to about 65 GPa. In yet another embodiment, it is desirable for this near-β titanium alloy to have a Young's modulus of less than or equal to about 60 GPa. It is desirable for this near-β titanium alloy to have a tensile strength of greater than or equal to about $750 \times 10^6$ Pascals (750 MPa). In one embodiment, this near-β titanium alloy has a tensile strength of greater than or equal to about 800 MPa. In yet another embodiment, this near-β titanium alloy has a tensile strength of greater than or equal to about 900 MPa. In yet another embodiment, this near-β titanium alloy has a tensile strength of greater than or equal to about 1,500 MPa.

It is also desirable for this near-β titanium alloy to display a superelastic nature at room temperature. In one embodiment, this near-β titanium alloy can recover a strain of greater than or equal to about 2%, while in another embodiment, this near-β titanium alloy can recover a strain of greater than or equal to about 2.5%. This near-β titanium alloy also displays a superplastic nature and permits cold working of greater than or equal to about 95% at room temperature. A particular example of this near-β titanium alloy is Gum Metal®.

In one embodiment, a protective structure comprising the α-β titanium alloy, the β-titanium alloy or the near-β titanium alloy can be applied to the turbine as a coating. The coating can be applied by methods such as plating, ion plasma deposition, powder coating, sputtering, electron beam (e-beam) deposition, and plasma thermal spray.

In another embodiment, the α-β titanium alloy, the β-titanium alloy or the near-β titanium alloy protective structures can be pre-formed into a cladding and then affixed to the turbine component by means of metallurgical bonding. The specific method of metallurgical bonding will depend on the α-β titanium alloy, the β-titanium alloy or the near-β titanium alloy composition and the alloy composition of the substrate. Examples of suitable methods for affixing the pre-formed cladding onto the turbine component are brazing, co-extrusion, explosive bonding, hot-isotactic-pressing (HIP), forging, fusion welding, friction-stir welding, or the like, or a combination comprising at least one of the foregoing processes.

The alloying elements and compositions of the protective structure are chosen based on the desired recoverable strain behavior, ductility, and/or degree of work hardening under plastic deformation. In one embodiment, the process selected for forming the metallurgical bond provides minimal interdiffusion between the substrate and the protective structure. It has been found that certain types of interdiffusion can lead to brittle intermetallic compounds that can weaken the so-formed bond between the two materials. To promote mechanical strength in addition to resistance to wear, impact and/or erosion, an optional diffusion-mitigating layer may be affixed to the substrate prior to affixing the protective structure. The protective structure is affixed to a surface of the diffusion-mitigating layer that is opposed to the surface in contact with the substrate. The diffusion-mitigating layer is characterized by a high solubility for titanium, nickel, and major substrate elements, as well as limited formation of low-melting temperature or brittle intermetallic reaction compounds. Suitable examples of metals that can be used in a diffusion-mitigating layer are vanadium, niobium, hafnium, tantalum, zirconium, or a combination comprising at least one of the foregoing metals.

The diffusion-mitigating layer is desirable when the substrate is formed of a titanium alloy. It has been found that some titanium alloy protective structures form undesirable phases at the interface with the substrate material. The use of the diffusion-mitigating layer substantially prevents interdiffusion and formation of undesirable phases.

In one embodiment, a process for providing a protective structure to a substrate comprises affixing a diffusion-mitigating layer on a region of the substrate to be protected with the protective structure, wherein the diffusion-mitigating layer is selected from a group consisting of pure metals or alloys that do not form brittle and/or low melting temperature phases due to interaction with the protective structure and/or the substrate. The protective structure is affixed to the diffusion-mitigating layer by co-extruding at a temperature of less than about 950° C. with an area reduction greater than or equal to about 2:1.

In yet another embodiment, a process for providing a protective structure to a substrate comprises affixing a diffusion-mitigating layer on a region of the substrate to be protected with the protective structure. The diffusion-mitigating layer is selected from a group consisting of pure metals or alloys that do not form brittle and/or low melting temperature phases due to interaction with the protective structure and/or the substrate. The diffusion-mitigating layer may be applied to the substrate as a coating or cladding. The diffusion-mitigating layer can be applied as a coating by methods such as plating, ion plasma deposition, powder coating, sputtering, electron beam (e-beam) deposition, and plasma thermal spray. The diffusion-mitigating layer can be applied as a cladding by methods such as brazing, co-extrusion, explosive bonding, hot-isotactic-pressing (HIP), co-forging, co-rolling, fusion welding, friction-stir welding, or the like, or a combination comprising at least one of the foregoing processes.

The protective structure can be affixed to the diffusion-mitigating layer by a process selected from the group consisting of brazing, welding, thermally spraying, laser cladding, hot rolling, cold rolling, ion plasma deposition, forging, explosion welding, fusion welding, friction stir welding, and cladding.

Reference will now be made to exemplary processes for affixing the protective structure onto the substrate. The protective structure can be affixed to the substrate by a diffusion bonding process such as a hot-isostatic pressing (HIP) process. An exemplary HIP process for affixing the protective structure to a substrate formed from a steel or a nickel based alloy employs a temperature preferably less than 950° C. and a pressure greater than 138 MPa. More preferably, the HIP process employs a temperature of about 700° C. to about 900° C. and a pressure of 138 MPa to about 276 MPa.

In an exemplary co-extrusion process, the preferred temperature and the area reduction ratios are preferably at a temperature less than 950° C. and an area reduction equal to or greater than 2:1. More preferably, the extrusion process employs a temperature of about 700° C. to about 900° C. with the area reduction ratio of 2:1 to 8:1. Alternatively, the protective structure can be directly deposited onto a surface of the substrate to form an integral coating.

The thickness of the protective structure is chosen to provide the desired resiliency and flexibility to those surfaces prone to erosion, wear and/or impact. In one embodiment the thickness of the protective structure is about $1 \times 10^{-3}$ to about 5 centimeters, while in another embodiment about 0.1 to about 1 centimeter more preferred.

In one embodiment, the protective structure can be realized by a process of chemistry modification of the erosion prone region in the substrate. The chemistry modification process can be used to modify the chemistry of the erosion prone region such that it will have a composition similar to that of the disclosed alloys after a homogenization heat treatment. The process is selected from the group consisting of laser cladding, plasma deposition, sputtering, brazing, and thermal spraying. The process is followed by a homogenization heat treatment such as annealing to control the composition on the erosion prone region. Upon completing the homogenization heat treatment, the protective structure can have a chemistry similar to the disclosed alloys and erosion resistant.

In another embodiment, the protective structure can be subjected to optional surface treatments such as application of high-energy beams from ion or laser sources or other mechanical means such as by shot peening or polishing. For example, a selected area of the protective structure may be subjected to ion implantation in order to selectively add desired quantities of certain metals. Ion implantation may be used to add $\beta$ phase stabilizers to the titanium alloy substrate or to the protective structure. Examples of suitable $\beta$ phase stabilizers are vanadium, niobium, tantalum, molybdenum, chromium, copper, or the like, or a combination comprising at least one of the foregoing $\beta$ phase stabilizers. Localized treatments can also be advantageously used to produce a $\beta$ rich titanium alloy.

Optionally, the protective structure, after surface treatment, can be exposed to a heat treatment process or an aging process. The heat treatment process preferably includes exposing the turbine component to a temperature of about 815° C. to about 1,010° C. for a period of up to about 4 hours. The aging process preferably includes heating the component to about 480° C. to about 815° C. for a period of up to about 12 hours. A combination of the heat treatment process and aging process is also contemplated herein.

A section replacement or insert can also be dimensioned to prevent or repair damage by erosion, wear and/or impact to the substrate. The insert can be affixed to the affected portion of the substrate by one of the foregoing processes. Although reference has been made to affixing the protective structure onto the substrate, with or without a diffusion-mitigating layer, it is also noted that an insert can be made from an $\alpha$-$\beta$ titanium alloy, a near-$\beta$ titanium alloy or a $\beta$-titanium alloy. In this manner, repair and damage protection of the substrate can be made by affixing the insert to the substrate.

As noted above, the entire substrate can be manufactured from a $\beta$-titanium alloy or a near-$\beta$ titanium alloy. The substrate is manufactured as a cast or cast-and-wrought structure. Alternatively, the substrate is consolidated from powder, where the resulting powder-metallurgy structure can further be wrought. The manufacturing process can make the $\beta$-titanium alloy or the near-$\beta$ titanium alloy into a desired shape. The shape can be heat treated, annealed, solution treated, or the like, to impart desired properties to the shape. Following this, the shape can be machined into its final form. Alternatively, the desired shape can be first machined into its final form and then subjected to heat treatment, annealing, solution treating, or the like. In one embodiment, a substrate comprising a $\beta$-titanium alloy or a near-$\beta$ titanium alloy can be affixed with the foregoing protective structures that comprise an $\alpha$-$\beta$ titanium alloy, a near-$\beta$ titanium alloy or a $\beta$-titanium alloy.

The following examples, which are meant to be exemplary, not limiting, illustrate compositions and methods of manufacturing of some of the various embodiments of the protective structures described herein.

EXAMPLE

This example was undertaken to demonstrate the erosion and wear resistance afforded by a protective structure comprising a β-containing titanium alloy. In this example, three β-titanium containing alloys, notably comprising Ti-5Al-2Sn-2Zr-4Mo-4Cr (Ti17); Ti-6Al-2Cr-2Mo-2Zr-2Sn (also termed Ti62222); and Ti-15Mo-3Al-2.7Nb-0.25Si, are compared with Stellite 6B® in a simulated water droplet erosion environment.

Figure 3:
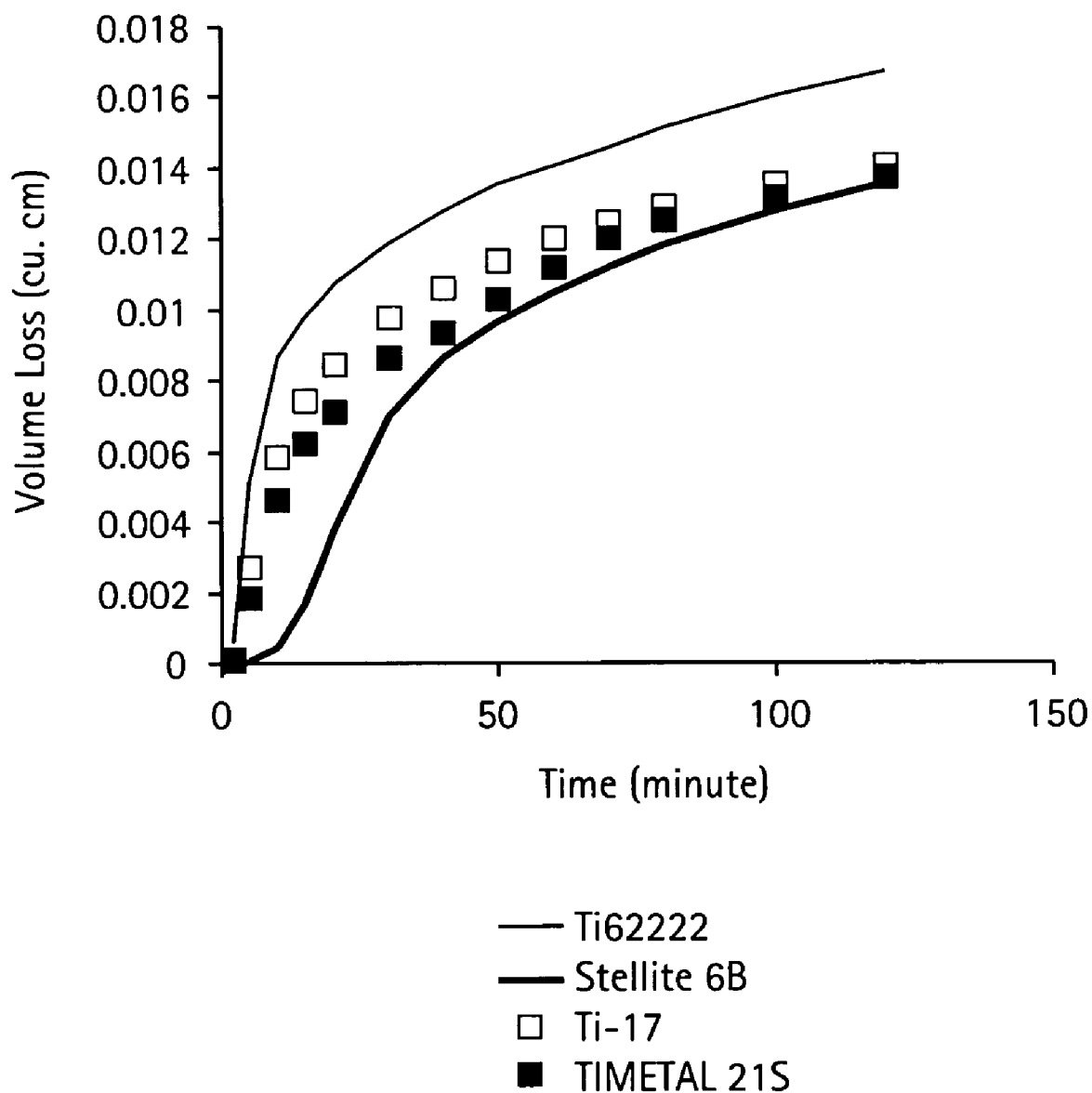
FIG. 3 is a graphical representation comparing the erosion performance of representative α-β or β-titanium alloys to that of Stellite 6B®.

The protective structure was subjected to water impingement at a tip speed of 750 foot/second. The test results are shown in FIG. 3. From the FIG. 3, it can be seen that the β-containing titanium alloy showed erosion protection comparable to that afforded by Stellite 6B®.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A turbine component, comprising:
a cast, wrought, or cast-and-wrought substrate;
a diffusion-mitigating layer affixed to the substrate, wherein the diffusion-mitigating layer is selected from a group consisting of vanadium, niobium, hafnium, tantalum, zirconium, and a combination comprising at least one of the foregoing metals; and
an erosion protective structure affixed to a surface of the diffusion-mitigating layer that is opposed to the surface in contact with the substrate, wherein the protective structure comprises an α-β titanium alloy, a near-β titanium alloy or a β-titanium alloy, wherein the α-β titanium alloy, the near-β titanium alloy or the β-titanium alloy each comprise a β phase that has a titanium rich body-center-cubic structure and belongs to Pearson symbol cl2 or space group Im3̄m; and wherein the protective structure forms the outer layer of the turbine component.

2. The turbine component of claim 1, wherein the α-β titanium alloy comprises a β phase and an α phase.

3. The turbine component of claim 1, wherein the α-β titanium alloy, the near-β titanium alloy, or the β-titanium alloy comprises at least 10 volume percent of a β phase, based on the total volume of the protective structure.

4. The turbine component of claim 1, wherein the protective structure comprises an α-β titanium alloy comprising Ti-6Al-4V that has been aged or solution treated and aged; a metastable β-titanium alloy comprising Ti-3Al-8V-6Cr-4Zr-4Mo; a near-β titanium alloy comprising Ti-10V-2Fe-3Al; a near-β titanium alloy comprising Ti-5Al-2Sn-4Mo-2Zn-4Cr; a β-titanium alloy comprising Ti-15V-3Cr-3Sn-3Al; a α-β titanium alloy comprising Ti-6Al-6V-2Sn that has been solution treated and aged or that has been annealed; an α-titanium alloy comprising Ti-6Al-2Sn-4Zr-2Mo that has been double annealed; a near-α titanium alloy comprising Ti-5.8Al-4Sn-3.5Zr-0.7Nb; a β-titanium alloy comprising Ti-15V-3Cr-3Sn-3Al that has been aged; a α-β titanium alloy comprising Ti-6Al-2Sn-4Zr-6Mo; a near-α titanium alloy comprising Ti-4Al-4Mo-2Sn; a near-α titanium alloy comprising Ti-5.5Al-3Sn-3Zr-0.5Nb; an α-β titanium alloy comprising Ti-6Al-6V-2Sn; a near-α titanium alloy comprising Ti-4Al-4Mo-2Sn; an α-β titanium alloy comprising Ti-6Al-7Nb; a near-α titanium alloy comprising Ti-6Al-2Sn-4Zr-2Mo; a β-titanium alloy comprising Ti-6Al-2Cr-2Mo-2Zr-2Sn; a β-titanium alloy comprising Ti-15Mo-3Al-2.7Nb-0.25Si; or a combination comprising at least one of the foregoing alloys.

5. The turbine component of claim 1, wherein the α-β titanium alloy, the near-β titanium alloy, or the β-titanium alloy comprises at least 30 volume percent of a β phase, based on the total volume of the protective structure.

6. The turbine component of claim 5, wherein the near-β titanium alloy comprises vanadium group elements in an amount of about 30 to about 60 weight percent, based on the total weight of the near-β titanium alloy, with the balance being substantially titanium.

7. The turbine component of claim 6, wherein the vanadium group elements comprise vanadium, niobium and/or tantalum.

8. The turbine component of claim 6, wherein the near-β titanium alloy can recover a strain of greater than or equal to about 2%.

9. The turbine component of claim 1, wherein the substrate comprises a component of a steam turbine, a gas turbine or a hydroelectric generation turbine.

10. The turbine component of claim 1, wherein the protective structure has a thickness of about 1×10⁻³ to about 5 centimeters and affords protection against wear, erosion and/or impact.

11. The turbine component of claim 1, wherein the near-β titanium alloy displays an elongation of greater than or equal to about 4% and an effective elastic strain of greater than or equal to about 0.7%.

12. The turbine component of claim 1, wherein the near-β titanium alloy displays an elongation of greater than or equal to about 10%.

13. The turbine component of claim 1, wherein the near-β titanium alloy displays an effective elastic strain of greater than or equal to about 0.8%.

14. The turbine component of claim 1, wherein the near-β titanium alloy comprises zirconium, hafnium and/or scandium in an amount of less than or equal to about 20 weight percent, based on the total weight of the near-β titanium alloy.

15. The turbine component of claim 1, wherein the near-β titanium alloy further comprises chromium, molybdenum, manganese, iron, cobalt, nickel, oxygen or combinations comprising at least one of the foregoing elements.

16. The turbine component of claim 1, where in the near-β titanium alloy has a Young's modulus of less than or equal to about 80 GPa.

17. The turbine component of claim 1, wherein the near-β titanium alloy has a tensile strength of greater than or equal to about 750 MPa.

18. The turbine component of claim 1, wherein the near-β titanium alloy can permit cold working of greater than or equal to about 95% at room temperature.

19. The turbine component of claim 1, wherein the turbine component comprises an airfoil, a seal, a shroud, or a splitter.

20. The turbine component of claim 1, wherein the turbine component is disposed in a path comprising air, steam, water, fuel, or combinations thereof.

* * * * *